US010913097B2

(12) United States Patent
Archer

(10) Patent No.: US 10,913,097 B2
(45) Date of Patent: Feb. 9, 2021

(54) HELICAL BENDING DEVICE

(71) Applicant: Hubbell Incorporated, Shelton, CT (US)

(72) Inventor: James Archer, Ashville, AL (US)

(73) Assignee: Hubbell Incorporated, Shelton, CT (US)

( * ) Notice: Subject to any disclaimer, the term of this patent is extended or adjusted under 35 U.S.C. 154(b) by 358 days.

(21) Appl. No.: 15/609,731

(22) Filed: May 31, 2017

(65) Prior Publication Data
US 2017/0341120 A1 Nov. 30, 2017

Related U.S. Application Data

(60) Provisional application No. 62/343,391, filed on May 31, 2016.

(51) Int. Cl.
*B21D 7/08* (2006.01)
*B21D 11/06* (2006.01)
*G02B 6/44* (2006.01)

(52) U.S. Cl.
CPC .............. *B21D 7/085* (2013.01); *B21D 11/06* (2013.01); *G02B 6/444* (2013.01); *G02B 6/4457* (2013.01)

(58) Field of Classification Search
CPC .......... B21D 7/085; B21D 11/06; B21D 7/08; B21D 7/02; B21D 7/03; B21D 7/04; B21D 5/01; B21D 5/0263; B21D 5/042; B21D 53/16; G02B 6/44; G02B 6/444; G02B 6/4457
USPC .................................. 72/135, 138, 139, 142
See application file for complete search history.

(56) References Cited

U.S. PATENT DOCUMENTS

| 217,870 A | 7/1879 | Groshans | |
|---|---|---|---|
| 1,542,355 A | 6/1925 | Barker | |
| 1,931,151 A * | 10/1933 | Mueller | B21D 53/16 29/897.312 |
| 2,702,066 A * | 2/1955 | Mathes | B21D 7/022 72/219 |
| 2,713,376 A * | 7/1955 | Bath | B21D 11/02 72/20.4 |
| 2,743,756 A * | 5/1956 | Fredericks | B21D 11/06 72/64 |
| 4,089,160 A * | 5/1978 | Beaston | B21D 7/022 59/56 |
| 4,843,858 A | 7/1989 | Grimm et al. | |
| 5,345,803 A | 9/1994 | Cutter | |
| 5,408,571 A | 4/1995 | Kaplan | |

(Continued)

OTHER PUBLICATIONS

PCT/US2017/035199 International Search Report and Written Opinion dated Aug. 7, 2017 (14 pages).

*Primary Examiner* — Teresa M Ekiert
*Assistant Examiner* — Sarkis A Aktavoukian
(74) *Attorney, Agent, or Firm* — Michael Best & Friedrich, LLP

(57) ABSTRACT

A bending device for forming a product from a workpiece includes a shaft driven to rotate by a motor, an actuator including an extendable end configured to secure a portion of the workpiece, and a die coupled to the shaft and driven about an axis. The die includes a peripheral portion including a channel configured to receive the workpiece. The channel includes a first end and a second end offset from the first end in a direction parallel to the axis. Rotation of the die about the axis causes the workpiece to bend along the channel.

21 Claims, 10 Drawing Sheets

(56) References Cited

U.S. PATENT DOCUMENTS

| | | | | |
|---|---|---|---|---|
| 5,497,643 A | * | 3/1996 | Koch | B21D 7/022 |
| | | | | 72/217 |
| 5,819,581 A | * | 10/1998 | Winton | B21D 7/022 |
| | | | | 72/458 |
| 5,867,624 A | * | 2/1999 | Forrester | G02B 6/48 |
| | | | | 385/100 |
| 2002/0003939 A1 | | 1/2002 | Hermsen et al. | |
| 2008/0193096 A1 | | 8/2008 | Jones et al. | |
| 2013/0086962 A1 | * | 4/2013 | Hayashi | B21D 11/06 |
| | | | | 72/146 |

* cited by examiner

HELICAL BENDING DEVICE

CROSS-REFERENCE TO RELATED APPLICATION

This application claims the benefit of prior-filed, U.S. Provisional Patent Application No. 62/343,391, filed May 31, 2016, the entire contents of which are incorporated by reference.

FIELD

The present disclosure relates to bending tools, and particularly to a channel bender.

SUMMARY

Fiber cable, such as all-dielectric self-supporting (ADSS) cable, is typically used for building and/or connecting fiber optic networks. An ADSS cable provides simple installation for distribution and transmission environments, since no support or messenger wire is required. Since it is not conductive, the ADSS cable may be used above ground neutral. A bracket may be provided for aerially storing and protecting an additional or reserve length of the cable and any associated splice points.

In one aspect, a bending device for forming a product from a workpiece includes a shaft driven to rotate by a motor, an actuator including an extendable end configured to secure a portion of the workpiece, and a die coupled to the shaft and driven about an axis. The die includes a peripheral portion including a channel configured to receive the workpiece. The channel includes a first end and a second end offset from the first end in a direction parallel to the axis. Rotation of the die about the axis causes the workpiece to bend along the channel.

In another aspect, a bending device for bending a workpiece includes a motor, a shaft coupled to the motor and driven to rotate by the motor, a block, a ram configured to secure a portion of the workpiece against the block, a die coupled to the shaft and driven about an axis, and a roller. The ram includes an extendable end. The die includes a peripheral portion including a channel configured to receive the workpiece. The channel includes a first end and a second end offset from the first end in a direction parallel to the axis. The roller is positioned adjacent a portion of the channel, and the roller is configured to bias the workpiece against a wall of the channel as the die rotates.

In yet another aspect, a method for forming a cable storage bracket includes: positioning a portion of a workpiece within a channel of a die; securing a portion of the workpiece against movement; positioning a biasing member against the workpiece to bias the workpiece against a wall of the channel; and rotating the die about an axis to bend the workpiece to a configuration in which one end of the workpiece is bent about the axis beyond the other end of the workpiece, the one end being offset from the other end in a direction parallel to the axis.

Other aspects of the application will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc.

Figure 1:
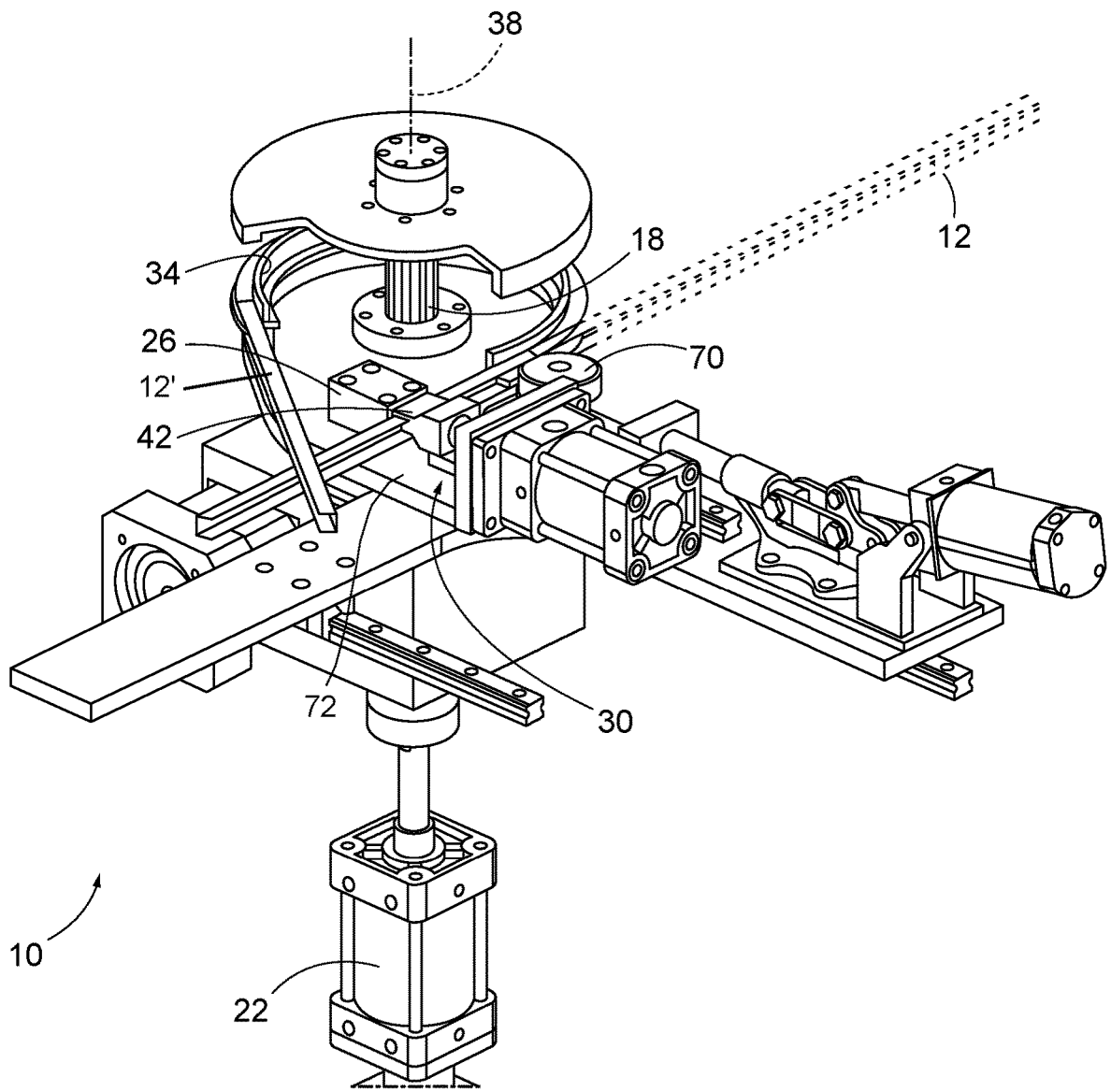
FIG. 1 is a perspective view of a bending device.
Figure 2:
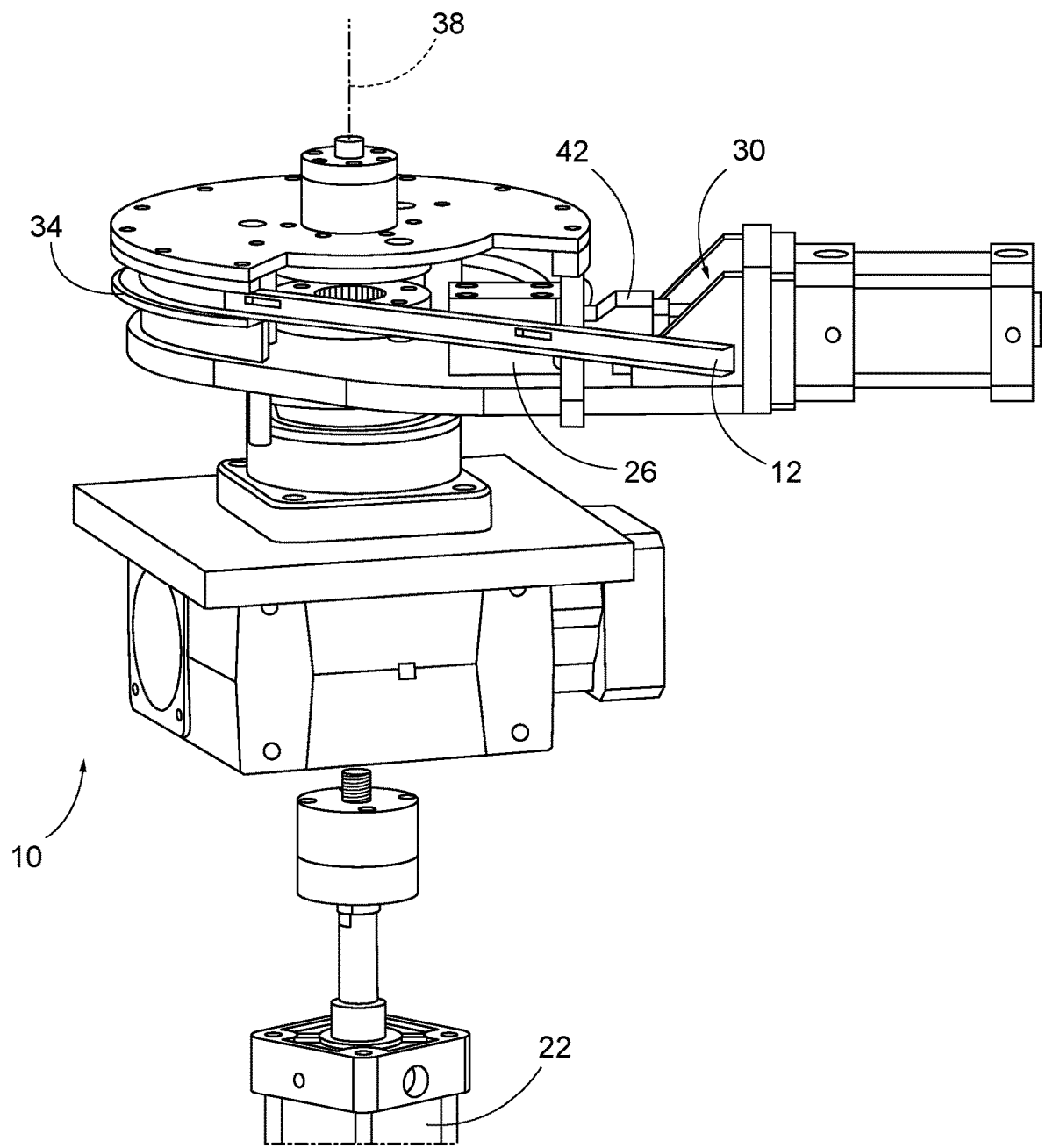
FIG. 2 is a perspective view of the bending device of FIG. 1.

FIGS. 1 and 2 illustrate a bending device 10 for bending a workpiece 12 to form, e.g., a bracket 14 (FIG. 6) for storing a length of wire or cable, e.g., fiber optic cable (not shown). The device 10 includes a shaft 18, a motor 22 coupled to the shaft 18, a block 26, a ram 30, and a mandrel or die 34. The shaft 18 defines an axis of rotation 38 and is rotated about the axis 38 by the motor 22. The block 26 is positioned adjacent an end of the die 34, and the ram 30 includes an end 42 that is extendable to engage the block 26. In the illustrated embodiment, the ram 30 is a linear actuator (e.g., a hydraulic cylinder).

Figure 3:
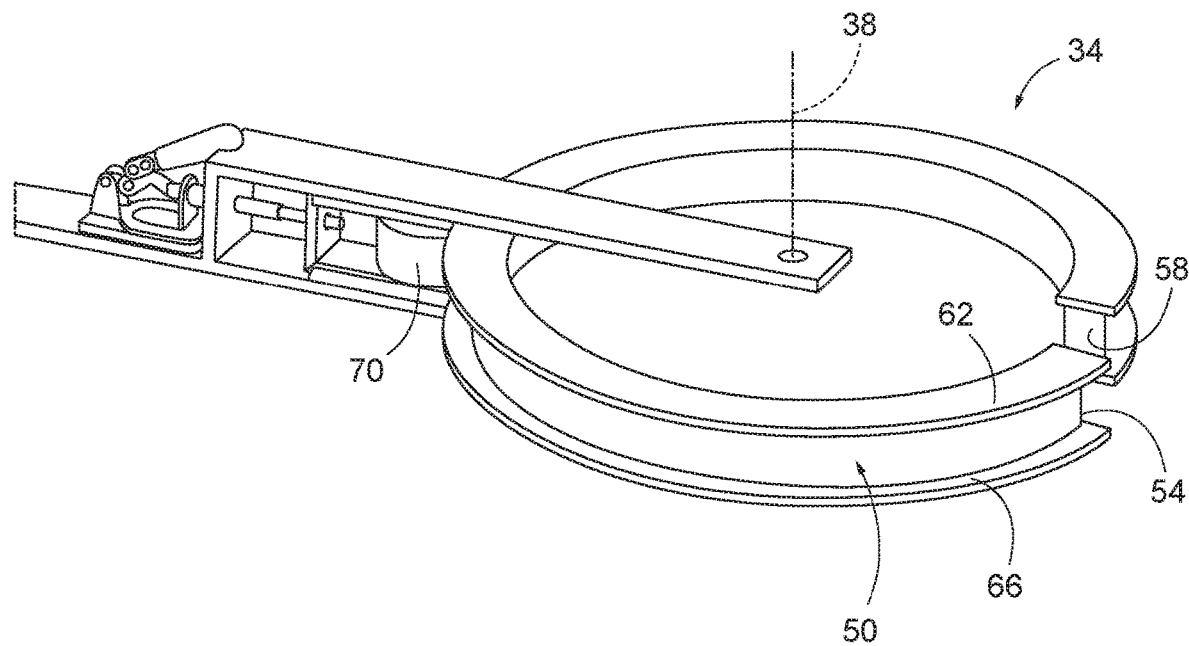
FIG. 3 is a perspective view of a portion of a bending device.
Figure 4:
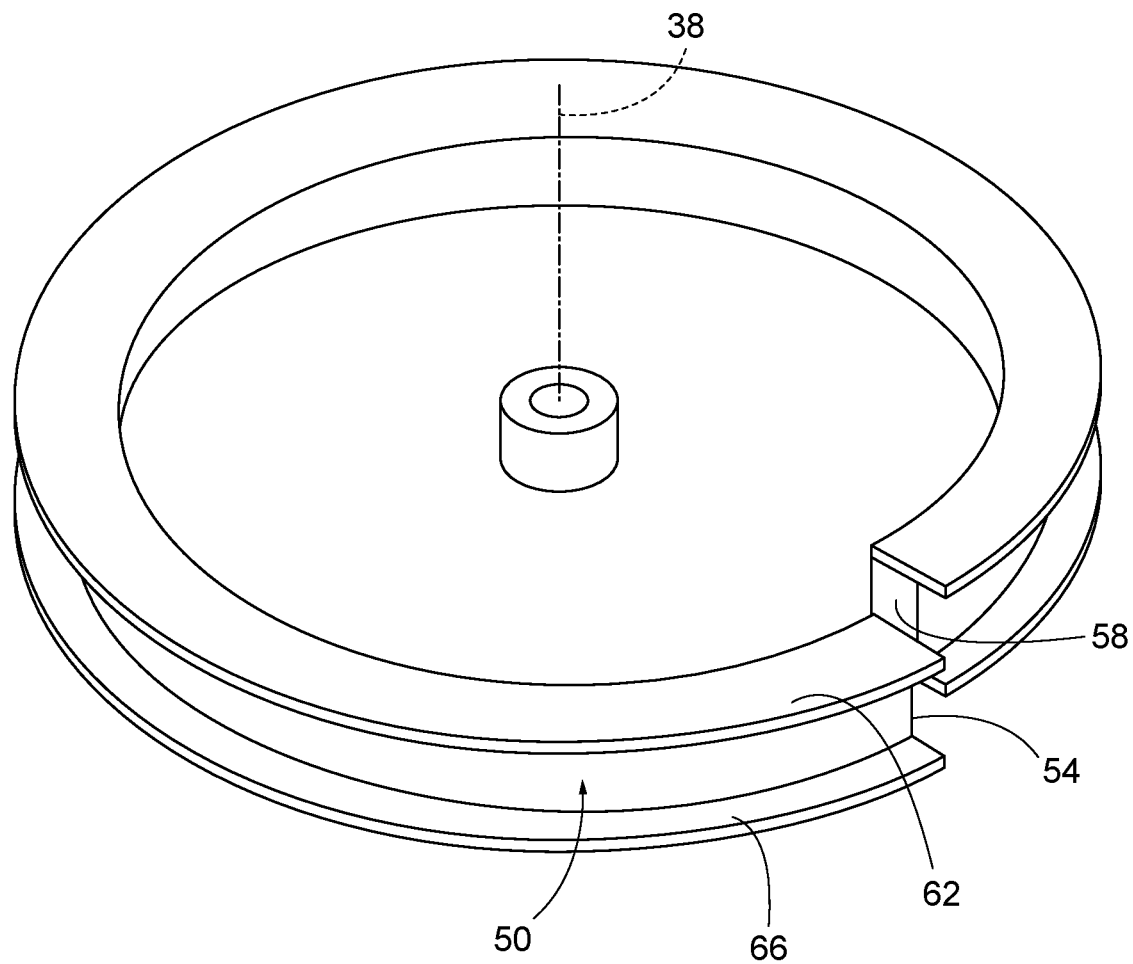
FIG. 4 is a perspective view of a die for the bending device of FIG. 3.

As shown in FIGS. 3 and 4, the die 34 has a round profile and includes a channel 50 extending along an outer periphery. The channel 50 extends in a generally helical shape around the axis of rotation 38 and includes a first end 54 and a second end 58. In the illustrated embodiment of FIGS. 3 and 4, the channel 50 extends through one full revolution around the axis 38, and the first end 54 is positioned adjacent the second end 58, although the first end 54 and the second end 58 are offset from one another in a direction parallel to the axis 38. In some embodiments (FIGS. 1 and 2), the channel may not form a closed profile and the first end and second end may not be positioned adjacent one another.

As shown in FIGS. 1 and 2, the helical shape of the channel 50 creates an axial offset between the ends of a workpiece 12, permitting the ends of the workpiece 12 to be over bent, or bent beyond the point at which the two ends will be positioned adjacent one another. In the illustrated embodiment, the channel 50 is positioned between an upper flange 62 and a lower flange 66. The flanges 62, 66 can control swedging or movement of the workpiece 12 during bending to ensure that the workpiece 12 is bent along the desired profile. In the illustrated embodiment, a roller 70 (FIGS. 1 and 3) is positioned adjacent the die 34, and the workpiece is positioned between the roller 70 and the die 34. The roller 70 biases the workpiece 12 against the die 34 as the die 34 rotates.

To form the bracket 14, an end of an elongated workpiece 12 (FIG. 1) is positioned within the channel 50 on the outer surface of the die 34. In one embodiment, the workpiece 12 is formed from aluminum. The ram 30 is extended to retain a portion of the workpiece 12 against the block 26. Then, the motor 22 is actuated to rotate the shaft 18, thereby driving the die 34 about the axis 38. In the illustrated embodiment, the ram 30 and die 34 are secured to the same support member 72 (FIG. 1), and both the ram 30 and the die 34 are rotated by the shaft 18 about the axis 38 (for example, as shown in FIG. 1, the ram 30 and die 34 may rotate in a clockwise direction as viewed from the top of the axis 38). In the illustrated embodiment, the roller 70 and the associated biasing structure remain stationary as the die 34 rotates. As the die 34 rotates, the workpiece 12 is bent or wrapped around the outer periphery of the die 34 (e.g., by the roller 70). The workpiece 12' (FIG. 1) is bent such that one end is positioned adjacent an opposite end of the workpiece 12', but is bent or rotated beyond the opposite end.

Figure 5:
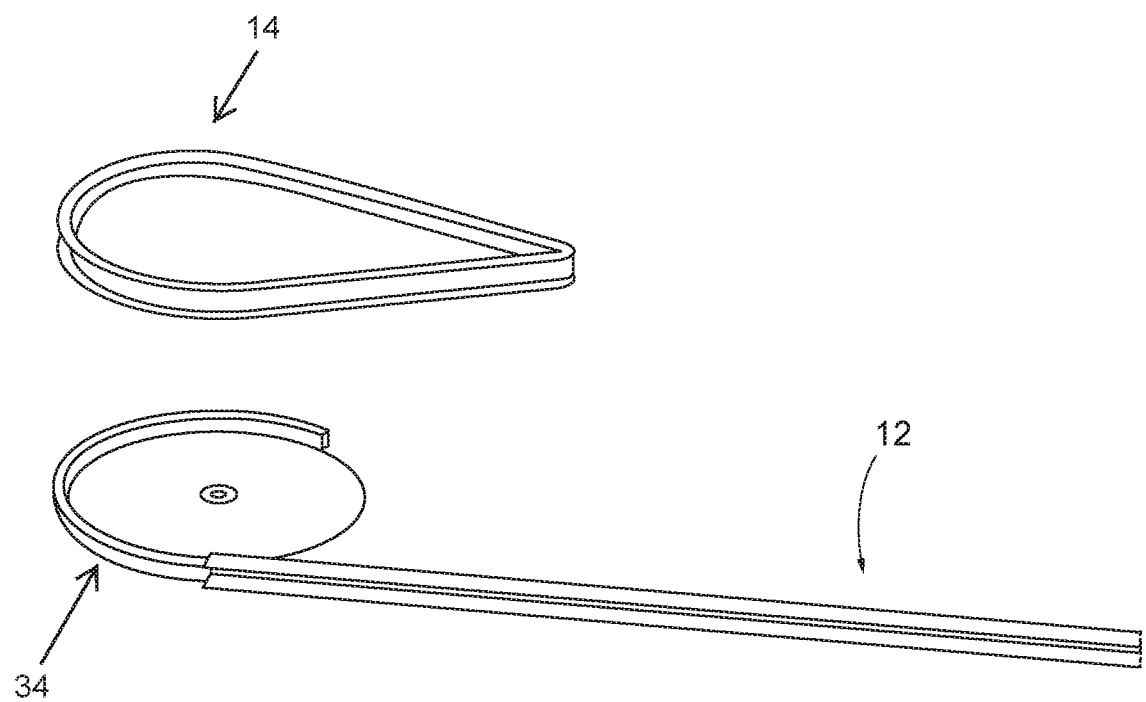
FIG. 5 is a perspective view of a workpiece formed by the bending device of FIG. 1.
Figure 6:
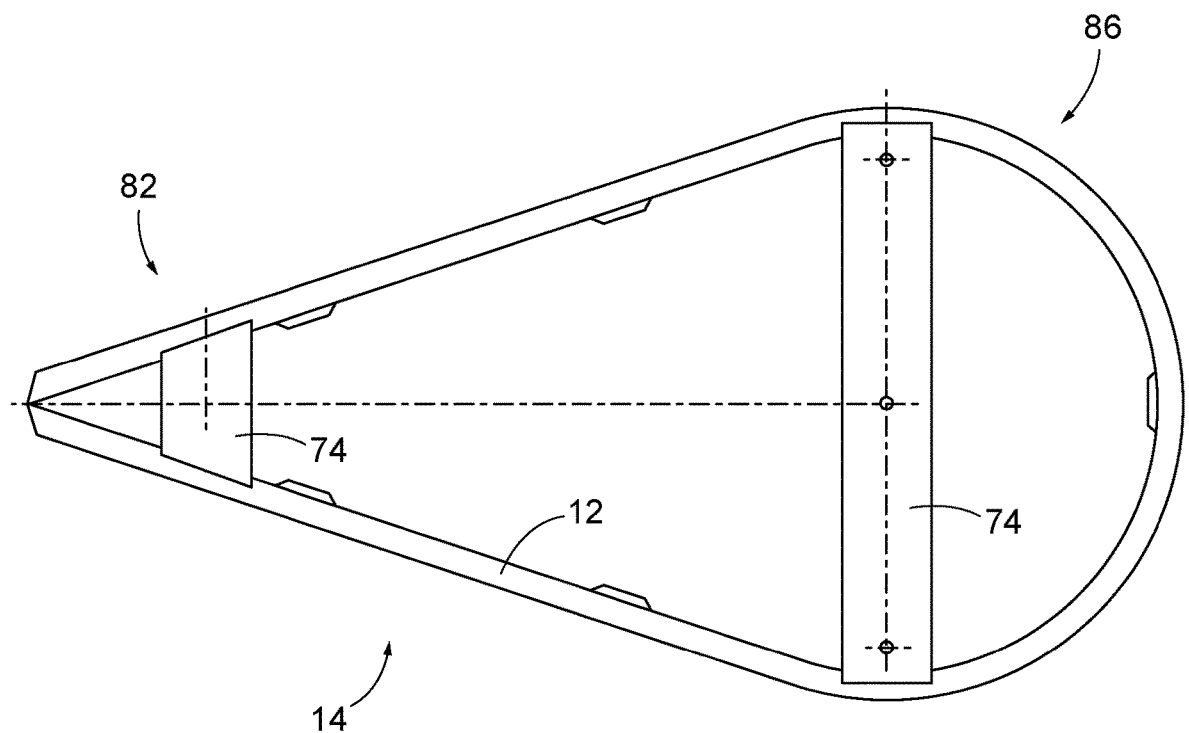
FIG. 6 is a plan view of a cable storage bracket.
Figure 7:
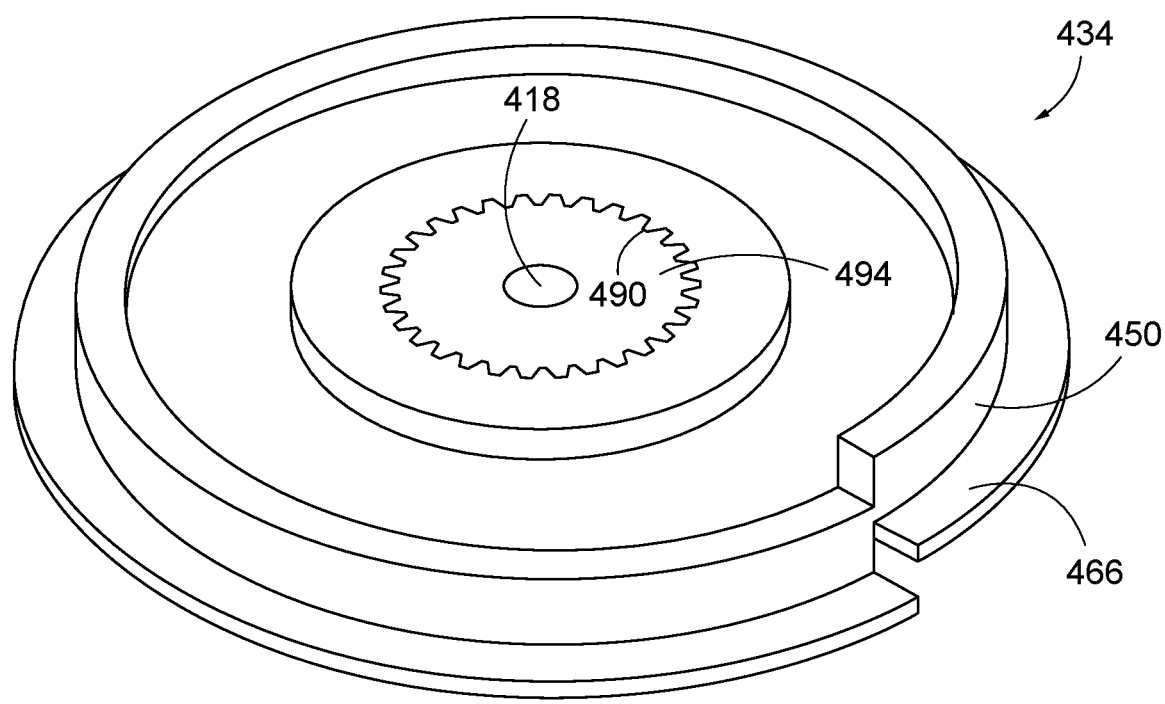
FIG. 7 is a perspective view of a die according to another embodiment.
Figure 8:
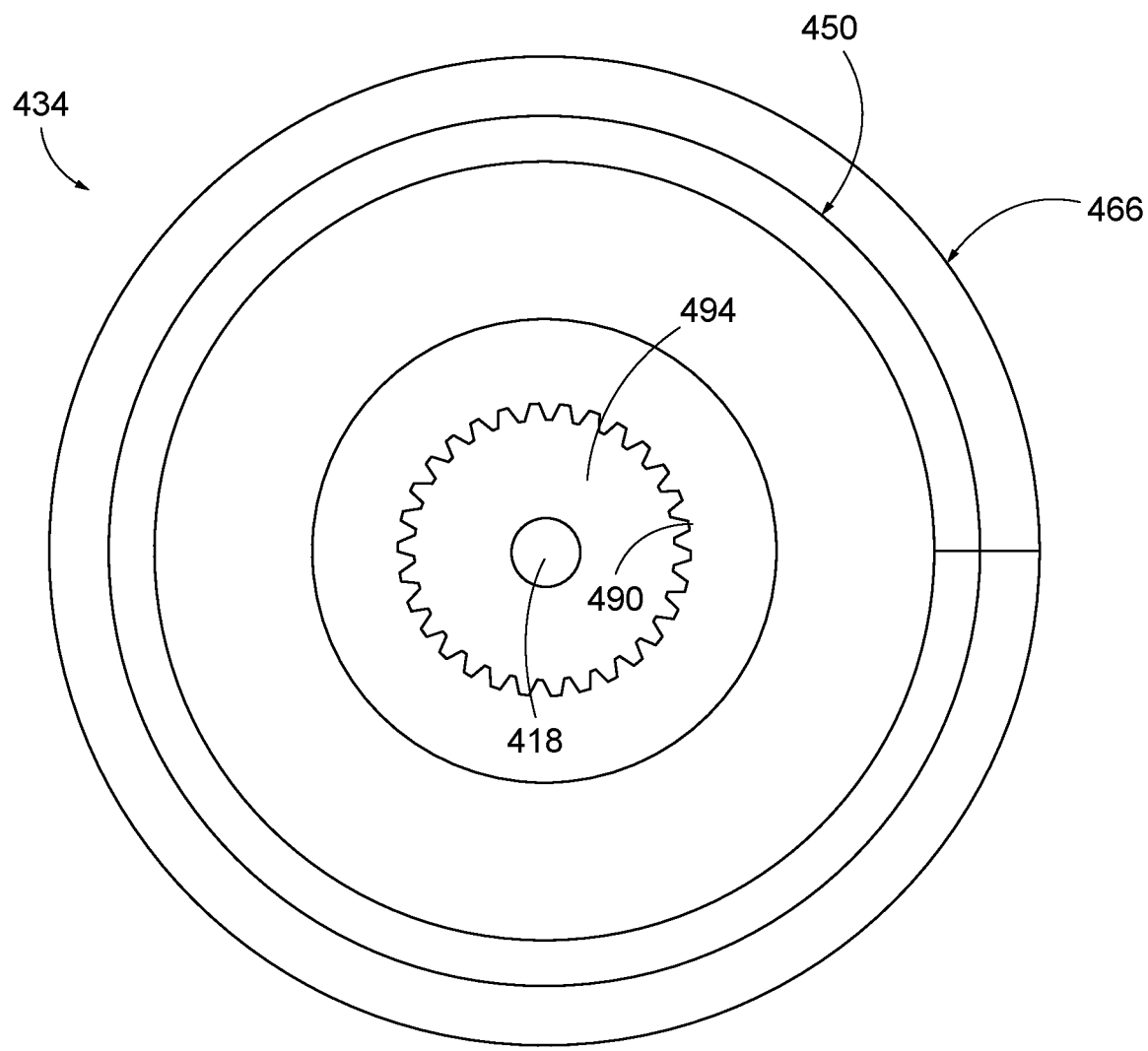
FIG. 8 is a plan view of the die of FIG. 7.

When the ram 30 is retracted away from the block 26, the ends of the workpiece 12 may spring back such that the ends do not overlap one another to the extent shown in FIGS. 1 and 2. As shown in FIG. 5, the workpiece 12 is removed from the die 34. Referring now to FIG. 6, braces or cross-members 74 are positioned across the workpiece 12 to extend between the sides of the workpiece 12. The end of each cross-member 74 is joined (e.g., by welding) to one side of the workpiece 12, forming the bracket 14 as shown in FIG. 6. The cross-members 74 provide reinforcement and increase the rigidity and strength of the bracket 14.

The storage bracket 14 includes a first end where the two ends of the workpiece 12 are brought together and a second end opposite the first end. In the illustrated embodiment, the storage bracket 14 forms a teardrop shape, with the first end forming a wedge portion 82 and the second end forming a round portion 86. The diameter of the round portion 86 is dependent on, among other things, the stiffness of the workpiece material and the workpiece's moment of inertia. The amount of spring back of the workpiece 12 can be controlled, and the bracket 14 may be formed without the need to weld the ends of the workpiece 12 together. The overbending of the workpiece 12 also reduces or eliminates weld cracking on the cross-members 74.

FIGS. 7-10 illustrate a die 434 according to another embodiment. The die 434 of FIGS. 7-10 is similar to the die 34 of FIG. 4, and similar features are identified with similar reference numbers, plus 400. In particular, the die 434 includes a channel 450 only including a lower flange 466 without an upper flange. In addition, the die 434 includes an internal gear surface or spline 490 that meshes with a pinion gear 494 coupled to the shaft 418. In other embodiments, the die 434 may be coupled to the shaft 418 in a different manner.

Figure 9:
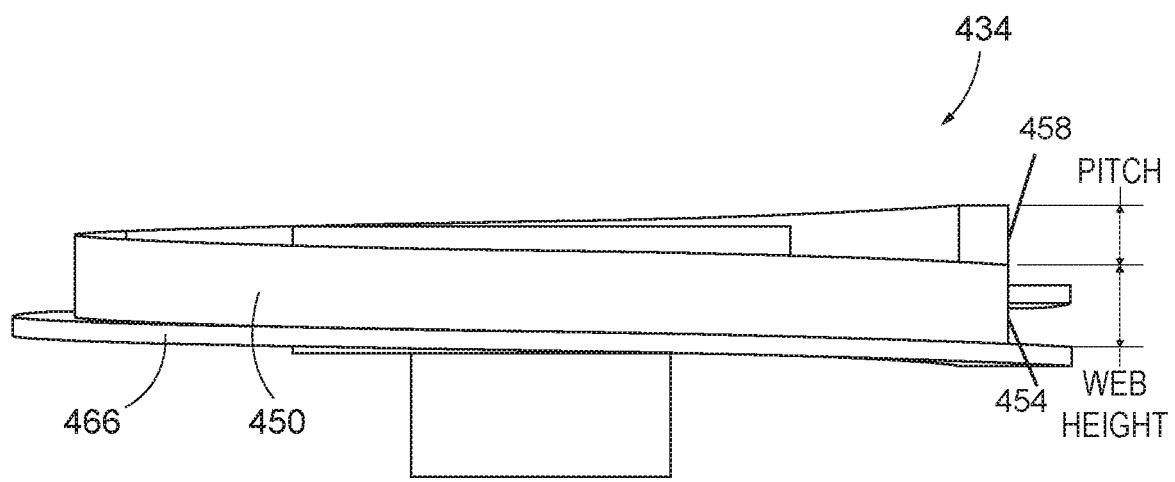
FIG. 9 is a side elevation view of the anvil of FIG. 7.
Figure 10:
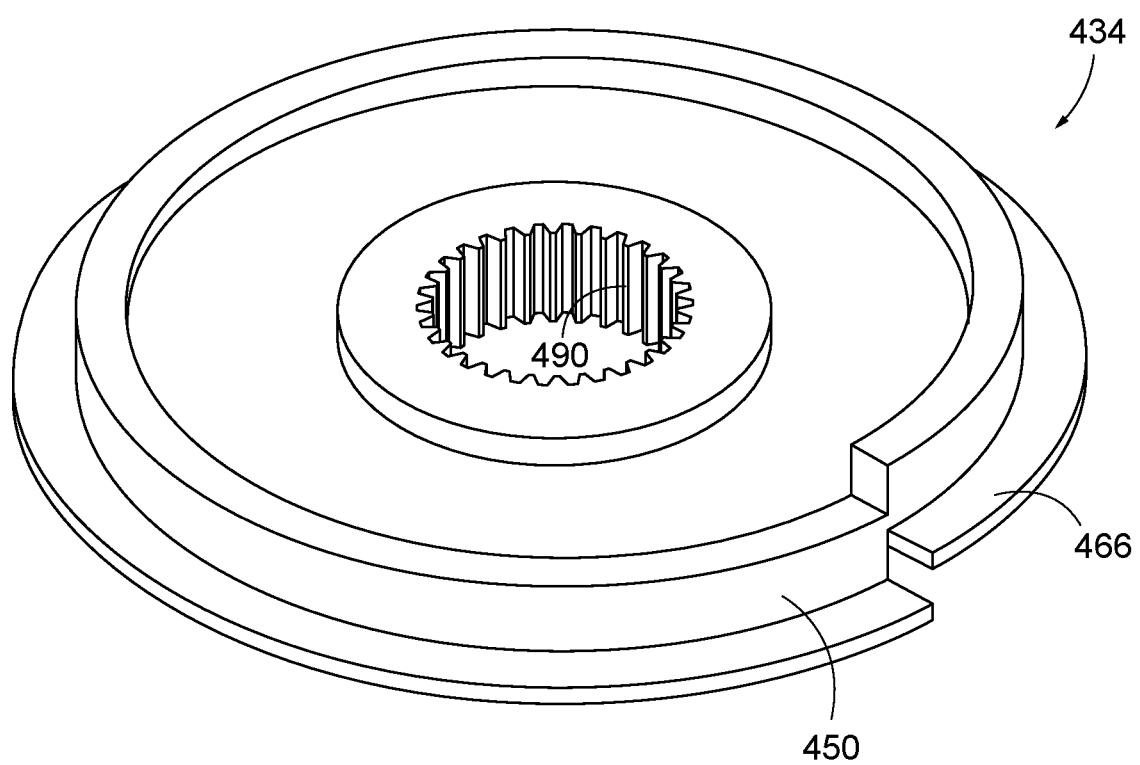
FIG. 10 is a perspective view of the anvil of FIG. 7 with an internal gear removed.

As shown in FIG. 9, the helical shape is defined by the channel 450. For example, the pitch of the bent workpiece 12 is determined by the web height and the axial offset between the first end 454 and the second end 458 of the channel 450.

Although certain aspects have been described in detail with reference to certain preferred embodiments, variations and modifications exist within the scope and spirit of one or more independent aspects as described. Various advantages and features are set forth in the following claims.

What is claimed is:

1. A method for forming a cable storage bracket from a workpiece including a first end and a second end, the method comprising:

positioning a first portion of the workpiece within a channel of a die, the first portion being positioned between the first end of the workpiece and the second end of the workpiece;

securing, by an actuator, a second portion of the workpiece against a block that is spaced apart from the channel of the die by a gap, the second portion being positioned between the first portion and the first end of the workpiece;

biasing the workpiece against a wall of the channel;

rotating the die about an axis to bend the workpiece to a configuration in which the first end of the workpiece is bent about the axis beyond the second end of the workpiece, the first end of the workpiece being offset from the second end of the workpiece in a direction parallel to the axis;

forming a first leg extending from the first end of the workpiece and a second leg extending from the second end of the workpiece; and securing the first leg of the workpiece relative to the second leg of the workpiece to form the cable storage bracket.

2. The method of claim 1, wherein forming the first leg extending from the first end of the workpiece and the second leg extending from the second end of the workpiece includes releasing the second portion to permit the first end of the workpiece to retract to a position adjacent the second end of the workpiece.

3. The method of claim 2, wherein forming the first leg extending from the first end of the workpiece and the second leg extending from the second end of the workpiece includes moving the first end of the workpiece and the second end of the workpiece to be aligned in a common plane.

4. The method of claim 1, wherein securing the first leg of the workpiece relative to the second leg of the workpiece includes securing at least one cross-member between the first leg and the second leg.

5. The method of claim 1, wherein rotating the die further includes bending the workpiece along the channel in a helical shape.

6. The method of claim 1, wherein securing, by the actuator, the second portion of the workpiece against the block further includes extending the actuator to clamp the second portion between the block and a distal end of the actuator.

7. A method for forming a cable storage bracket from a workpiece including a first end and a second end, the method comprising:

positioning a first portion of the workpiece against a wall of the die, the first portion being positioned between the first end of the workpiece and the second end of the workpiece;

securing, by an actuator, a second portion of the workpiece against movement a block that is spaced apart from the wall of the die by a gap, the second portion being positioned between the first portion and the first end of the workpiece;

biasing the first portion of the workpiece against the wall of the die;

rotating the die about an axis to bend the workpiece to a configuration in which the first end of the workpiece is bent about the axis beyond the second end of the workpiece, the first end of the workpiece being offset from the second end of the workpiece in a direction parallel to the axis, forming a first leg extending from the first end of the workpiece and a second leg extending from the second end of the workpiece; and securing the first leg of the workpiece relative to the second leg of the workpiece to form the cable storage bracket.

8. The method of claim 7, wherein forming the first leg extending from the first end of the workpiece and the second leg extending from the second end of the workpiece includes releasing the second portion to permit the first end of the workpiece to retract to a position adjacent the second end of the workpiece.

9. The method of claim 8, wherein forming the first leg extending from the first end of the workpiece and the second leg extending from the second end of the workpiece includes moving the first end of the workpiece and the second end of the workpiece to be aligned in a common plane.

10. The method of claim 7, wherein securing the first leg of the workpiece relative to the second leg of the workpiece includes securing at least one cross-member between the first leg and the second leg.

11. The method of claim 7, wherein rotating the die further includes bending the workpiece along the wall in a helical shape.

12. The method of claim 7, further comprising positioning the first portion of the workpiece adjacent a flange extending from the wall of the die.

13. The method of claim 7, further comprising positioning the first portion of the workpiece between a first flange and a second flange, the first flange and the second flange extending from the wall of the die.

14. The method of claim 7, wherein securing, by the actuator, the second portion of the workpiece against the block further includes extending the actuator to clamp the second portion between the block and a distal end of the actuator.

15. The method of claim 7, wherein rotating the die about the axis to the configuration in which the first end of the workpiece is bent about the axis beyond the second end of the workpiece includes guiding the workpiece along a circumference of the die such that the second portion of the workpiece is offset from the first portion.

16. A method for forming a cable storage bracket from a workpiece including a first end and a second end, the method comprising:

providing a die having an axis and a channel with a first end and a second end adjacent to the first end of the channel, the second end of the channel being offset from the first end of the channel along a direction parallel to the axis;

positioning a first portion of the workpiece within the channel at or adjacent to the first end of the channel, the first portion being positioned between the first end of the workpiece and the second end of the workpiece;

securing, by an actuator, a second portion of the workpiece against a block that is spaced apart from the channel of the die by a gap, the second portion being positioned between the first portion and the first end of the workpiece;

biasing the workpiece against a wall of the channel;

rotating the die about an axis to bend the workpiece to a configuration in which the first end of the workpiece is bent about the axis beyond the second end of the workpiece, the first end of the workpiece being offset from the second end of the workpiece in a direction parallel to the axis, forming a first leg extending from the first end of the workpiece and a second leg extending from the second end of the workpiece; and securing the first leg of the workpiece relative to the second leg of the workpiece to form the cable storage bracket.

17. The method of claim 16, wherein rotating the die about the axis to a configuration in which the first end of the workpiece is bent about the axis beyond the second end of the workpiece includes guiding the workpiece along the channel such that the second end of the workpiece is positioned adjacent the second end of the channel.

18. The method of claim 16, wherein forming the first leg extending from the first end of the workpiece and the second leg extending from the second end of the workpiece includes releasing the second portion to permit the first end of the workpiece to retract to a position adjacent the second end of the workpiece.

19. The method of claim 18, wherein forming the first leg extending from the first end of the workpiece and the second leg extending from the second end of the workpiece includes moving the first end of the workpiece and the second end of the workpiece to be aligned in a common plane.

20. The method of claim 16, wherein securing the first leg of the workpiece relative to the second leg of the workpiece includes securing at least one cross-member between the first leg and the second leg.

21. The method of claim 16, wherein securing, by the actuator, the second portion of the workpiece against the block further extending the actuator to clamp the second portion between the block and a distal end of the actuator.

* * * * *